Figure 1:
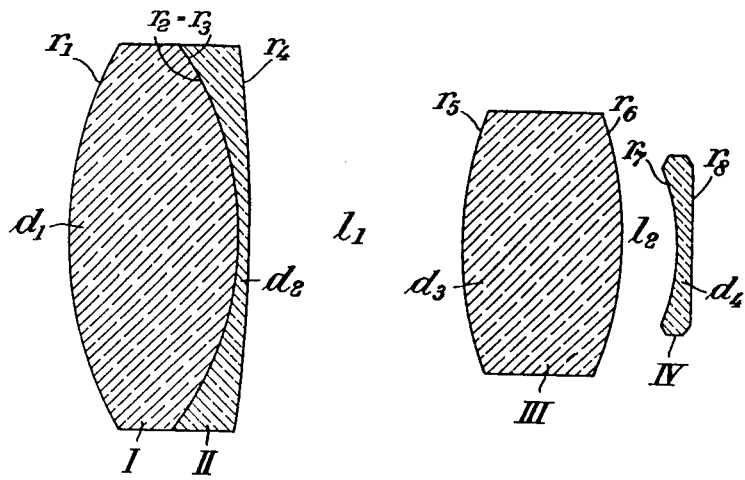

Jan. 23, 1940.    F. W. GEHRKE ET AL    2,187,780
LENS SYSTEM
Filed April 19, 1938

Inventors
Friedrich Wilhelm Gehrke
Robert Tiedeken
By Their Attorney
Philip S. Hopkins Patented Jan. 23, 1940

2,187,780

UNITED STATES PATENT OFFICE 2,187,780

LENS SYSTEM

Friedrich Wilhelm Gehrke, Munich, and Robert Tiedeken, Grosshadern, near Munich, Germany, assignors, by mesne assignments, to Agfa Ansco Corporation, Binghamton, N. Y., a corporation of Delaware Application April 19, 1938, Serial No. 202,832
In Germany April 24, 1937

4 Claims. (Cl. 88—57)

This invention relates to an improved lens system and more particularly to an improved objective of very great illuminating power which is especially adapted for projection.

It is known that in order to obtain a good anastigmatic plane picture field within Seidel's region it is necessary for the value of the Petzval sum to be low. It is also known that the value of the Petzval sum is determined to a small extent by the glass selected for the lenses, and to a large extent by the positions of the lenses. If the negative member as with the triplet is placed between the two positive members, the favorable ratio between the incidence heights of the individual members necessary for obtaining a low Petzval sum can, with the normal length of a lens system, be attained only if each of the three members has a relatively high refractive power. This, however, readily leads to great zonal spherical aberration if the objective has an extremely high illuminating power. It is known that the values of the spherical aberation of the single lenses in systems of such high illuminating power as regards their absolute value must remain below 2 in order that the zonal error does not become too great. Herein the focal length of the whole system is equal to one (1).

It is an object of this invention is to provide a lens system consisting of at least two separate positive members in which the whole or a part of the negative refractive power is contained in a separated lens which is placed behind the last positive member whereby at a relative aperture of 1:1.6 and over a low Petzval sum is attained.

If a single separated negative lens is used, the first positive member may, with advantage to the correction of chromatic and spherical aberration, be cemented. If only a part of the negative refractive power be contained in the separated negative lens behind the last positive, the other part being in a separate negative lens in front of this positive, the positive refractive power of the front member can be distributed over two members which, for the purpose of color correction, may have cement surfaces.

Another object of the invention is to provide in contrast with the known lens systems of a similar kind, the arrangement of the last separated negative lens in such a position that the sectional distance of the picture focus is at least ¼ of the total focal length of the system. By this means it is attained that the last negative lens exercises a substantial influence on all the remaining spherical errors, in the image, as for instance, the spherical aberration, coma, astigmatism and distortion is attained. By simultaneously substantial influence of all spherical errors in the image we understand precisely that the numerical values of the Seidel partial coefficients A, B, Γ, P and E (as defined below) for the last lenses are of the same degree and the proportion A:Γ should be between 1:0.5 and 1:2. The exact mathematical research has shown that it is necessary for a simultaneous influence on the spherical errors in the image to arrange an approximately concave plane lens which faces the film with its approximately plane surface.

Further objects and advantages of the present invention will appear from the description following hereinafter.

Reference is made to the accompanying drawing in which the invention is illustrated.

Figure 2:
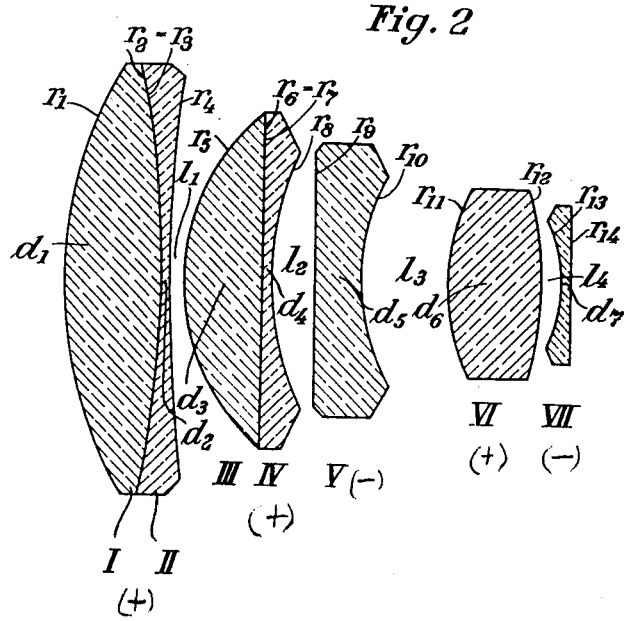

Figure 1 shows a three-membered projection objective having two positive members (I, II; III) and only one separated negative lens (IV) and Figure 2 shows a five-membered system having three positive members (I, II; III, IV; VI) and two separated negative lenses (V; VII).

Because the notations used by those skilled in the art vary considerably, it is considered advisable to define and explain the terms as used in this specification.

If $h_k$ stands for the incident height at the $k$th surface, i. e., the distance from the axis to the point where a ray penetrates the $k$th surface, measured from the axis, then it is known that for this $k$th surface $$h_k = h_1 \cdot \frac{S_2}{S'_1} \cdot \frac{S_3}{S'_2} \cdots \frac{S_k}{S'_{k-1}}$$

wherein $S_k$ is the distance of the object point from the vertex, for the $k$th surface of a system, and $S'_k$ is the distance of the image point from the vertex, for the $k$th surface. The designated image is the paraxial image point (Gauss).

If $d_\mu$ stands for the distance from the $\mu$th vertex to the $(\mu+1)$th vertex, it is further known that the apparent length $\delta_{(k)}$ of the system from the first to the $k$th vertex is given by $$\delta_{(k)} = \sum_{\lambda=2}^{k} \frac{d_{\mu-1}}{n_\mu \cdot \frac{h_{\mu-1}}{h_1} \cdot \frac{h_\mu}{h_1}}$$

wherein $n_\mu$ is the refractive index of the medium preceding the $\mu$th surface, and $n'_\mu$ (to be used below) is the refractive index of the medium following the $\mu$th surface. (See in this respect M. Berek, Grundlagen der prakt. Optik, Berlin 1930, page 25, and F. Staeble, Die Seidel'schen Bildfehler bei Beschränkung auf die 1. Potenz der Linsendicken, Abhandlung der Bayer. Akademie der Wissenschaften, No. 30, 1935.)

Therefrom Seidel's partial coefficients (A, B, Γ, P, and E) become, for the $k$th layer of the system:

$$A_k = \left(\frac{h_k}{h_1}\right)^4 n^2_k \left(\frac{1}{r_k}-\frac{1}{s_k}\right)^2 \left(\frac{1}{n'_k s'_k}-\frac{1}{n_k s_k}\right)$$

$$B_k = \left[\frac{1}{\left(\frac{h_k}{h_1}\right)^2 n_k\left(\frac{1}{r_k}-\frac{1}{s_k}\right)}+\sigma_{(k)}\right] \cdot A_k = \tau_k . A_k$$

wherein $\tau_k$ stands for the expression in brackets.

$$\Gamma_k = \tau_k . B_k$$

$$P_k = -\frac{1}{r_k}\left(\frac{1}{n'_k}-\frac{1}{n_k}\right)$$

$$E_k = \tau_k(\Gamma_k + P_k)$$

wherein P stands for the Petzval sum, and $r_k$ is the radius of the $k$th surface. As stated above, this Petzval sum should be as low as possible to obtain a good anastigmatic plane picture field. Since the heights $h_k$ in the above formulae only occur as ratios $h_k/h_1$, $h_1$ may be set as equal to one ($h_1 = 1$).

It is well known how both principal points H and H' are determined in every single lens of an optical system. The distances from these first and second principal points, respectively of the $\lambda$th lens, to an object point and to a Gaussian image point, respectively, may be designated by $s_\lambda$ and $s'_\lambda$, respectively. The incidence height $h_\lambda$ of a paraxial ray at the principal planes of the $\lambda$th lens is given by $$h_\lambda = h_1 \cdot \frac{s_2}{s'_1} \cdot \frac{s_3}{s'_2} \cdots \frac{s_\lambda}{s'_{\lambda-1}}$$

wherein, as above, $h_1$ may be set equal to one.

The distance from the second principal point $H'_{\lambda-1}$ of the $(\lambda-1)$th lens to the first principal point $H_\lambda$ of the $\lambda$th lens may be designated by $e_{\lambda-1}$.

It has further been found according to the invention that the relationship between the influence of the separated negative lens on the axial and extra-axial errors (more exactly the relationship between the Seidel partial coefficients A, B, Γ, E for a lens of this form) depends only on the magnitude of the factor $e_l$ which is defined by the equation $$e_l = \sum_{\lambda=2}^{l} \frac{e_{\lambda-1}}{h_{\lambda-1} h_\lambda}$$

wherein $l$ is the number of lenses of the system. According to the invention a favorable compensation of errors is obtained by selecting the quantities so that $$3.0\ f < e_l < 3.5\ f$$

wherein $f$ is the focal length of the system, i. e., the distance from the second principal point to the second focal point of the system.

The best possible fulfilment of the isoplanatic conditions, and therewith a correction of the coma, are attained by selecting for the last positive lens an axial thickness of at least 0.15 f.

Finally it has been shown to be advantageous for obtaining proper values of the differences of focal length and sectional distance for the various colors when using a number of negative members, to provide in the first two positive members cement surfaces which correct for color to a high degree, and to use for the last positive a glass having a $\nu$-value lying between 30 and 45.

By $\nu$-value is meant the reciprocal relative dispersion between the hydrogen lines C (of wavelength 6563 A. U.) and F (of wavelength 4861 A. U.) which is given by $$\nu = \frac{n_d - 1}{n_F - n_C}$$

wherein $n_d$ is the refractive index of the glass of the single lenses for the helium line of wavelength 5876 A. U., and wherein $n_F$ and $n_C$ are the corresponding refractive indices for the hydrogen lines F and C.

With the aid of these precautions it is possible to correct all errors in the picture produced by an objective of the type referred to at a relative aperture of 1:1.4 up to a picture angle of $2\sigma \sim 20°$. In other words, $2\sigma$ is the angle subtended at the objective by the picture on the screen.

The following table gives examples of values of the dimensions marked in the drawing and of $n_d$ and $\nu$ for the various lenses, the dimensions being in millimeters:

*Figure 1*

|  |  | $n_d$ | $\nu$ |
|---|---|---|---|
| $r_1 = +75.0$ | $d_1 = 33.0$ | 1.5182 | 59.0 |
| $r_2 = r_3 = -60.0$ | $d_2 = 2.0$ | 1.7400 | 28.2 |
| $r_4 = -273.871$ | $l_1 = 42.328$ |  |  |
| $r_5 = +70.808$ | $d_3 = 30.0$ | 1.6031 | 60.7 |
| $r_6 = -77.496$ | $l_2 = 10.994$ |  |  |
| $r_7 = -36.592$ | $d_4 = 2.0$ | 1.6034 | 38.0 |
| $r_8 = +643.627$ |  |  |  |

*Figure 2*

|  |  | $n_d$ | $\nu$ |
|---|---|---|---|
| $r_1 = +80.0$ | $d_1 = 19.0$ | 1.6031 | 60.7 |
| $r_2 = r_3 = -200.2$ | $d_2 = 2.0$ | 1.6034 | 38.0 |
| $r_4 = +356.4$ | $l_1 = 2.703$ |  |  |
| $r_5 = +40.8$ | $d_3 = 16.0$ | 1.6031 | 60.7 |
| $r_6 = r_7 = \infty$ | $d_4 = 2.0$ | 1.6034 | 38.0 |
| $r_8 = +63.392$ | $l_2 = 7.293$ |  |  |
| $r_9 = +661.892$ | $d_5 = 10.0$ | 1.7400 | 28.2 |
| $r_{10} = +45.708$ | $l_3 = 16.482$ |  |  |
| $r_{11} = +36.0$ | $d_6 = 18.57$ | 1.6056 | 43.9 |
| $r_{12} = -56.416$ | $l_4 = 3.635$ |  |  |
| $r_{13} = -29.65$ | $d_7 = 2.0$ | 1.7400 | 28.2 |
| $r_{14} = -432.0$ |  |  |  |

Herein the radii $r_n$, the thicknesses $d_n$ and the air gaps $l_n$ between the $n$th and $(n+1)$th surface are given for a focal length of $f = 100$.

We claim:

1. A lens system comprising at least two separate positive members and a separate negative lens behind the last positive member, said lens system having a relative aperture of 1:1.6 and over, said negative lens being approximately concavo-plane and adapted to correct essentially all the spherical image errors, the absolute Seidel partial value A of the spherical aberration of said negative lens lying between 0.5 and 2.0, the proportion of said partial value A to the partial value Γ being between 1:0.5 and 1:2.0, the position and the refractive power of said positive members and said negative lens being adjusted in such a manner that the value of the factor $e_l$, defined by the equation $$e_l = \sum_{\lambda=2}^{l} \frac{e_{\lambda-1}}{h_{\lambda-1}h_\lambda}$$

wherein $e_{\lambda-1}$ is the distance from the second principal point of the $(\lambda-1)$th lens to the first principal point of the $\lambda$th lens, and $h_\lambda$ and $h_{\lambda-1}$ are the incidence heights at the principal planes of the $\lambda$th and $(\lambda-1)$th lenses respectively of a paraxial ray whose incidence height is 1 at the principal planes of the first lens, lies between 3.0 f and 3.5 f and the section distance of the image focal point is greater than ¼ f and less than ⅓ f, wherein f is the focal length of said lens system.

2. A lens system comprising at least two separate positive members, a separate negative lens behind the last positive member and a separate negative lens in front of the last positive member, said lens system having a relative aperture of 1:1.6 and over, said negative lenses being approximately concavo-plane and adapted to correct essentially all the spherical image errors, the absolute Seidel partial value A of the spherical aberration of said negative lenses lying between 0.5 and 2.0, the proportion of said partial value A to the partial value Γ being between 1:0.5 and 1:2.0, the position and the refractive power of said positive members and said negative lenses being adjusted in such a manner that the value of the factor $e_l$, defined by the equation $$e_l = \sum_{\lambda=2}^{l} \frac{e_{\lambda-1}}{h_{\lambda-1}h_\lambda}$$

wherein $e_{\lambda-1}$ is the distance from the second principal point of the $(\lambda-1)$th lens to the first principal point of the $\lambda$th lens, and $h_\lambda$ and $h_{\lambda-1}$ are the incidence heights at the principal planes of the $\lambda$th and $(\lambda-1)$th lenses respectively of a paraxial ray whose incidence height is 1 at the principal planes of the first lens, lies between 3.0 f and 3.5 f and the section distance of the image focal point is greater than ¼ f and less than ⅓ f, wherein f is the focal length of said lens system.

3. A lens system comprising at least two separate positive members and a separate negative lens behind the last positive member, said lens system having a relative aperture of 1:1.6 and over, said negative lens being approximately concavo-plane and adapted to correct essentially all the spherical image errors, the absolute Seidel partial value A of the spherical aberration of said negative lens lying between 0.5 and 2.0, the proportion of said partial value A to the partial value Γ being between 1:0.5 and 1:2.0, the position and the refractive power of said positive members and said negative lens being adjusted in such a manner that the value of the factor $e_l$, defined by the equation $$e_l = \sum_{\lambda=2}^{l} \frac{e_{\lambda-1}}{h_{\lambda-1}h_\lambda}$$

wherein $e_{\lambda-1}$ is the distance from the second principal point of the $(\lambda-1)$th lens to the first principal point of the $\lambda$th lens, and $h_\lambda$ and $h_{\lambda-1}$ are the incidence heights at the principal planes of the $\lambda$th and $(\lambda-1)$th lenses respectively of a paraxial ray whose incidence height is 1 at the principal planes of the first lens, lies between 3.0 f and 3.5 f and the distance of the image focal point is greater than ¼ f and less than ⅓ f, the axial thickness of the last positive lens being at least 0.15 f, wherein f is the focal length of said lens system.

4. A lens system comprising at least two separate positive members and a separate negative lens behind the last positive member, said lens system having a relative aperture of 1:1.6 and over, said negative lens being approximately concavo-plane and adapted to correct essentially all the spherical image errors, the absolute Seidel partial value A of the spherical aberration of said negative lens lying between 0.5 and 2.0, the proportion of said partial value A to the partial value Γ being between 1:0.5 and 1:2.0, the position and the refractive power of said positive members and said negative lens being adjusted in such a manner that the value of the factor $e_l$, defined by the equation $$e_l = \sum_{\lambda=2}^{l} \frac{e_{\lambda-1}}{h_{\lambda-1}h_\lambda}$$

wherein $e_{\lambda-1}$ is the distance from the second principal point of the $(\lambda-1)$th lens to the first principal point of the $\lambda$th lens, and $h_\lambda$ and $h_{\lambda-1}$ are the incidence heights at the principal planes of the $\lambda$th and $(\lambda-1)$th lenses respectively of a paraxial ray whose incidence height is 1 at the principal planes of the first lens, lies between 3.0 f and 3.5 f and the section distance of the image focal point is greater than ¼ f and less than ⅓ f, wherein f is the focal length of said lens system, the last postive member having a $\nu$-value lying between 30 and 45, said $\nu$-value being the reciprocal dispersion ratio.

FRIEDRICH WILHELM GEHRKE.
ROBERT TIEDEKEN.